May 17, 1932. R. H. WHITE 1,858,533
LUBRICATING SYSTEM
Filed April 19, 1930   4 Sheets-Sheet 1

INVENTOR
Rollin H. White
BY
Wayne M. Hart
ATTORNEY

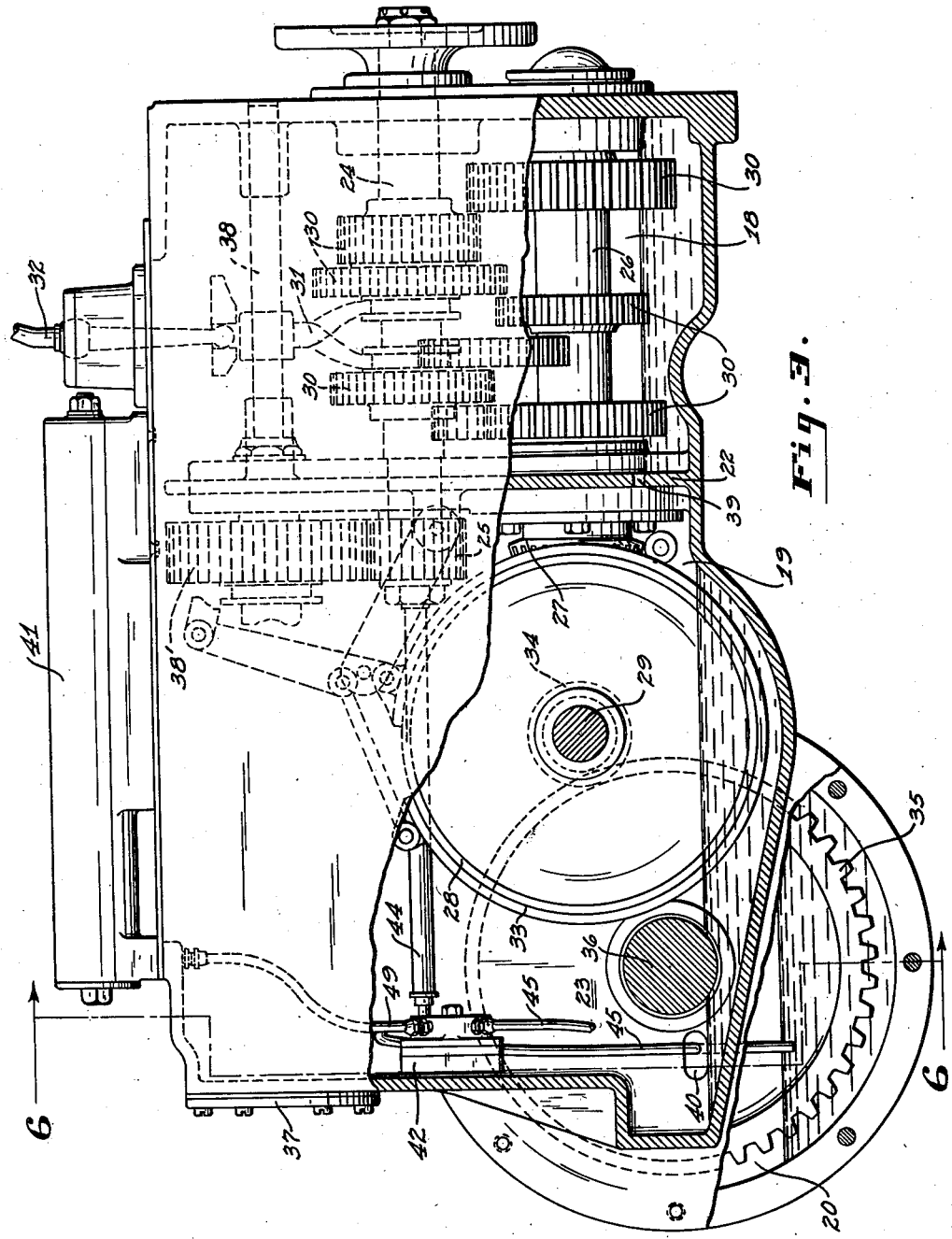

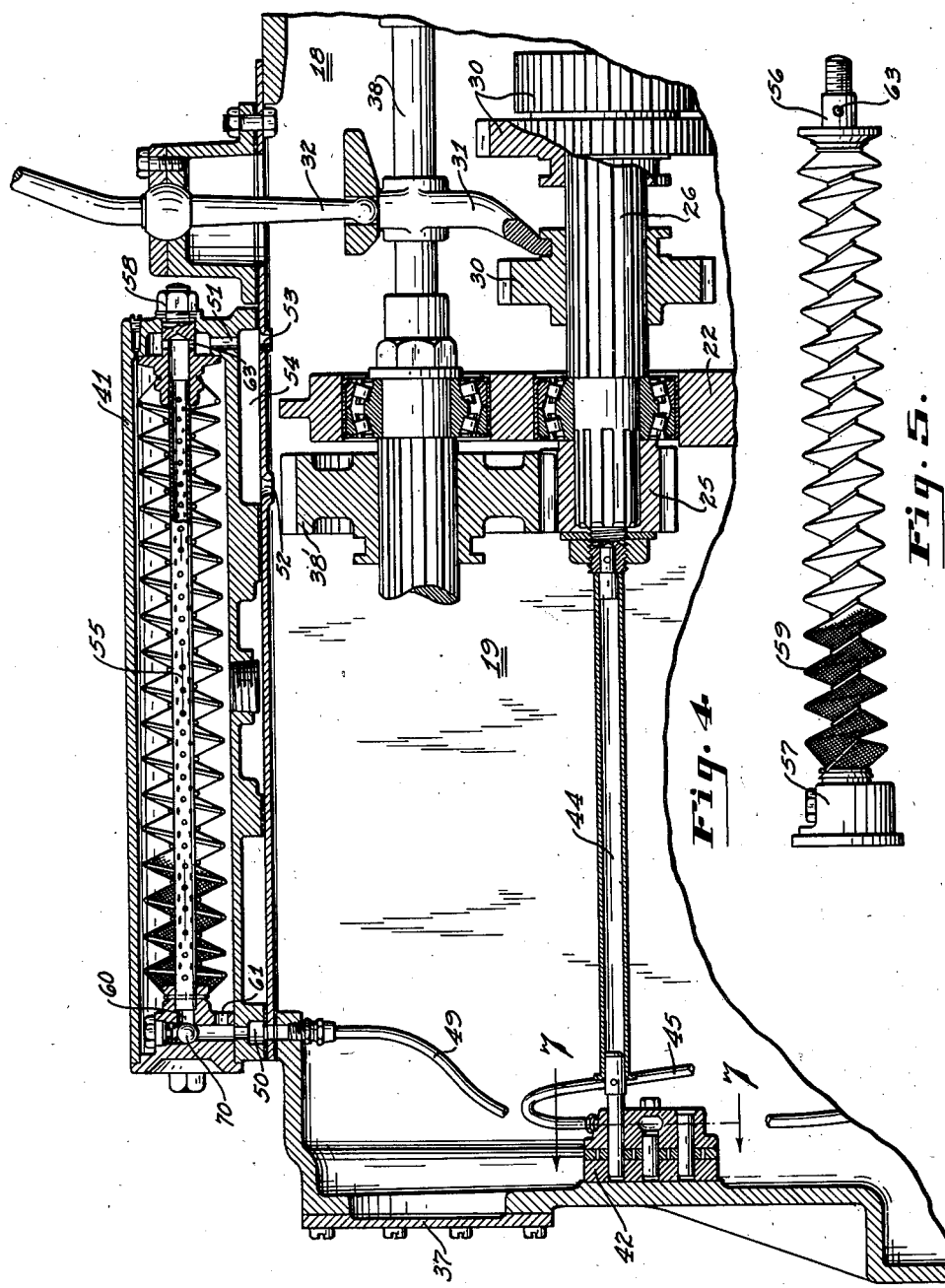

May 17, 1932.    R. H. WHITE    1,858,533
LUBRICATING SYSTEM
Filed April 19, 1930    4 Sheets-Sheet 4
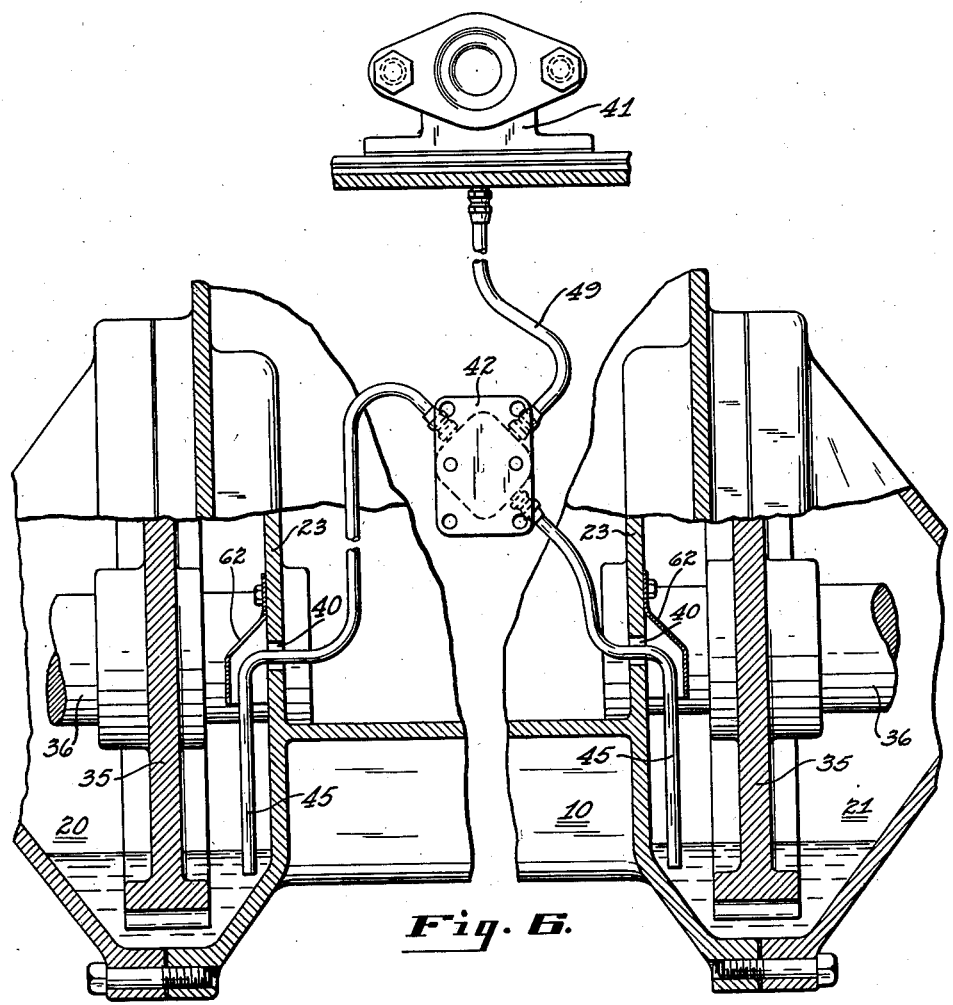
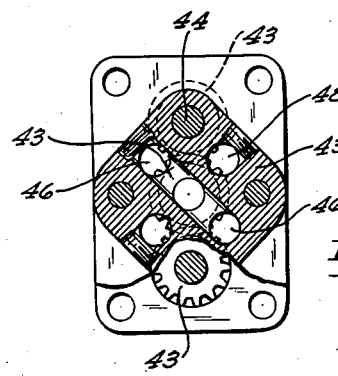
INVENTOR
BY Rollin H. White
Wayne M. Hart
ATTORNEY Patented May 17, 1932

1,858,533

UNITED STATES PATENT OFFICE

ROLLIN H. WHITE, OF CLEVELAND HEIGHTS, OHIO, ASSIGNOR TO THE CLEVELAND TRACTOR COMPANY, OF CLEVELAND, OHIO

LUBRICATING SYSTEM

Application filed April 19, 1930. Serial No. 445,788.

This invention relates to tractors and more particularly to a tractor lubricating system.

An object of my invention is to provide a circulating oiling system for tractors which will efficiently lubricate all of the power transmission mechanism thereof.

Another object of my invention resides in the manner of circulating oil through a plurality of separated compartments in a tractor transmission case to maintain a uniform body of the lubricant therein.

Still another object of the invention is to provide a tractor lubricating system wherein lubricant is circulated in a circuit partly by pressure and partly by gravity.

A further object of the invention is the provision of a lubricating system for tractors which includes a section for straining and distributing oil, such unit being detachable from the exterior of the transmission casing as a unit.

Other objects of the invention will appear from the following description taken in connection with the drawings, which form a part of the specification, and in which:

Fig. 3 is a side elevation of the transmission section of a tractor, partially broken away.

Fig. 4 is a sectional view taken on line 4—4 of Fig. 2.

Fig. 5 is an elevational view of the strainer unit removed from the lubricating system.

Fig. 6 is a sectional view taken on line 6—6 of Fig. 3.

Fig. 7 is a sectional view of the pump taken on line 7—7 of Fig. 4.

Figure 1:
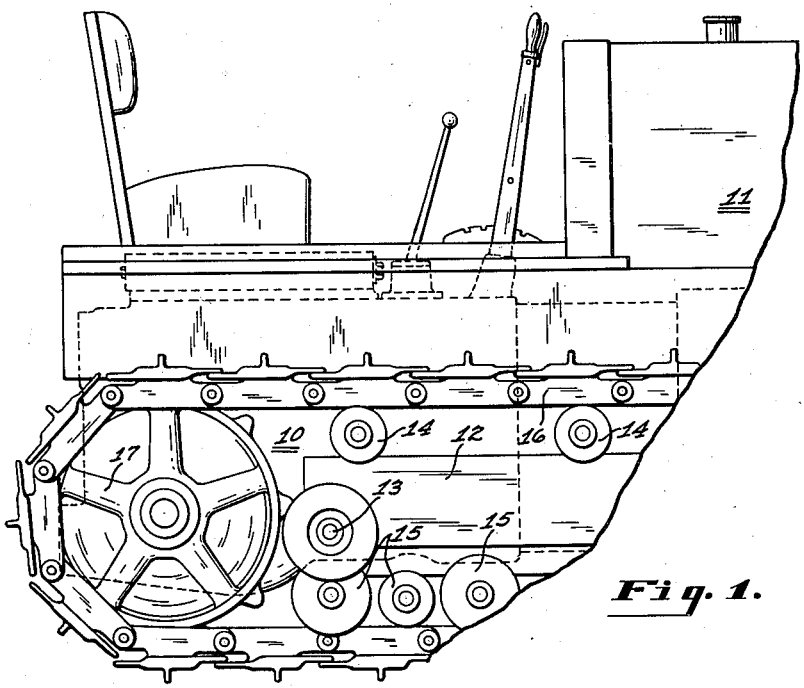
Fig. 1 is a fragmentary side elevational view of a tractor.
Figure 2:
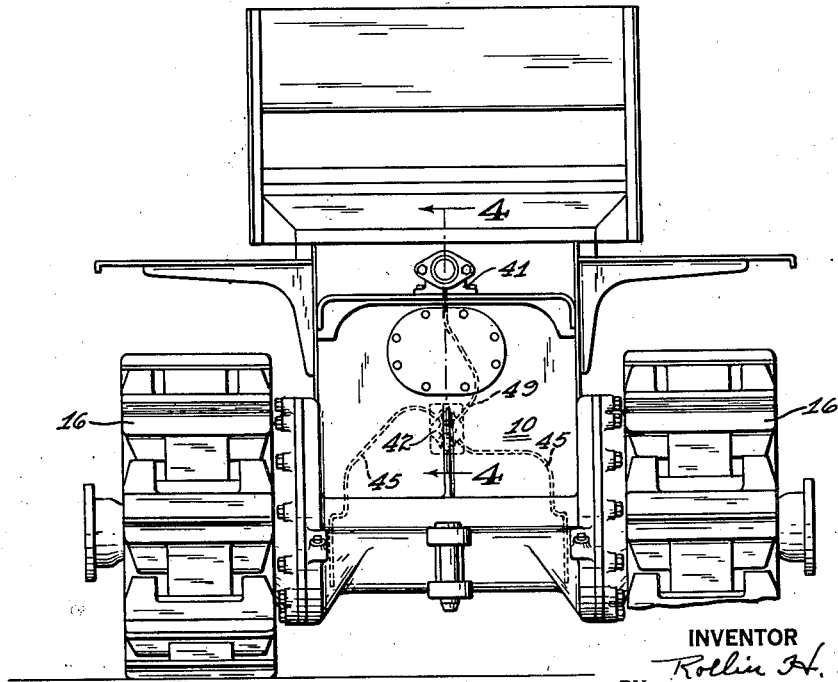
Fig. 2 is a rear end elevation of the same.

Referring now to the drawings by characters of reference, 10 designates generally the transmission casing of a tracklaying tractor which with the motor unit 11 forms the main supporting frame. Side frames 12 are pivotally mounted at 13 to the transmission casing and carry upper track supporting rollers 14 and lower bearing rollers 15, endless tracks 16 being entrained around the side frames, rollers and the rear sprockets 17.

The transmission casing is formed of a plurality of bolted together sections and forms a plurality of compartments 18, 19, 20 and 21. The compartments 18 and 19 are in longitudinal alignment, the forward compartment forming a housing for the change speed gearing and the rear compartment housing a portion of the final drive mechanism. The two rear side compartments 20 and 21 serve to house the reduction section of the final drive mechanism. Dividing the front and rear transmission compartments is an integral wall 22, while a wall 23 separates each of the side compartments from the rear central compartment 19.

A longitudinally extending drive shaft 24 extends longitudinally through the compartment and projects through the wall 22 into the compartment, such shaft being rotated by the motor unit and having a gear 25 on its rear end. A counter shaft 26 parallels the drive shaft and also projects through the wall 22, there being a bevel drive gear 27 on the rear end for rotating transmission gearing 28 with which the transversely extending shafts 29 are connected. Conventional change speed gears 30 are arranged on the shafts 24 and 26 in the forward compartment, there being a shifting yoke 31 operated by the lever 32 for changing the gear relation. A brake 33 is associated with each of the drive mechanisms associated with the shafts 29 to cause a different relative rotation thereof to steer the tractor. The shafts 29 project through the walls 23 into the compartments 20 and 21, being provided on their ends with a gear 34 which mesh with a bull gear 35 fixed to a final drive shaft 36 extending through each compartment 20 and 21 and upon which the sprockets 17 are fixed.

When the cover plate 37 is removed, a shaft 38 can be inserted to extend longitudinally through the compartments 18 and 19. A gear 38' is fixed on such shaft in a relation to mesh with the gear 25, there being a belt driving pulley (not known) secured to the end of the shaft 38 exteriorly of the transmission casing.

In order to adequately and efficiently lubricate the transmission above described so that the gears and bearings will be properly oiled, I provide a lubricating system which I will now describe. The gears 30 on the counter shaft will run in a bath of oil, as the wall 23 is provided with openings 39, sufficiently high to maintain a sufficient body of oil in the compartment for this purpose. Oil will overflow by gravity through the openings 39 into the compartment 19, the bottom of which is in a considerably lower level. Oil will overflow from the compartment 19 into the compartments 20 and 21 through ports 40 in the side walls 23. Sufficient body will remain in the compartment 19 to allow the differential to rotate partially therein. The bottom of the compartments is considerably below the plane of the ports 40, and oil in such compartments will partially submerge the bull gears 35. It will be seen that oil circulates by gravity from the compartment 18 to the compartment 19, and from there into the compartments 20 and 21. The gears in such compartment either run in oil or transmit oil to gears with which they mesh, while the rotation of the gears will throw oil to the bearings.

A distributor casing 41 is removably secured to the top wall of the transmission casing, and a pump is arranged to draw oil from the compartments 20 and 21 and move the same through the distributor from which it flows into the compartments 18 and 19, as will be hereinafter described. A pump casing 42 is fixed to the rear wall of the compartment 19, and a gear pump 43 is arranged in the casing and driven by the shaft 44 which is associated with the drive shaft 24. A conduit 45 extends from each compartment 20 and 21 through the ports into the compartment 19, and communicates with ports 46 in the pump casing leading to the pump gears. The pump casing is formed with an outlet port 48 with which the conduit 49, leading to the distributor 41, communicates. The open ends of the conduits 45 are arranged a distance above the bottom of the compartments 20 and 21 to leave a sufficient quantity of oil submerging a portion of the bull gears when the pump is operating. A shield 62 is bolted to the walls 23 within the compartments 20 and 21 and extends below the ports 40. Such shields are provided to prevent oil rising above the ports, when either side of the tractor is elevated as in side hill work, from running out through the ports back into the compartment 19.

The distributor casing is formed, preferably, as a hollow casting which is bolted to the top of the compartment 19. A port 50 is in communication with the conduit 49, and an outlet port 51 opens into a chamber 54 formed between the casing and the transmission casing. Ducts 52 and 53 extend through the transmission wall within the chamber, such ducts being arranged to direct oil draining therethrough to fall on the gears 38$^1$ in the compartment 19 and one of the gears 30 in the compartment 18.

A strainer unit is detachably secured in the distributor casing, and is also removable with the distributor. A perforated core 55 extends longitudinally of the casing 41, being inserted endwise therein, and a head 56 is secured to the forward end of the core while a head 57 is secured to the rear end of the core. The forward head extends through the front wall of the casing and a nut 58 is threaded thereon to draw the flange of the head 57 tightly against the rear open end of the casing. Surrounding the core is a helical screen 59. The head 57 communicates with the port 50 and has two outlet ducts 60 and 61, one opening into the core and the other exteriorly thereof directly into casing. Associated with the duct 60 is a spring pressed valve 70 which normally prevents oil passing into the end of the core except when pressure in the system requires relieving. Normally, oil flows from the port 50 through the duct 61, in the head, and into the casing where it must pass through the screen and core before leaving through openings 63 in the head 56 before entering the outlet 51 in the distributor casing. It will be noted that the screen unit can be detached and removed from the distributor by unscrewing the nut 58, and that the distributor can be detached from the transmission casing by removing only its securing bolts. The distributor directs oil into the ducts through which it drains into the compartments 18 and 19, thus completing the lubricating system. It will be noted, also, that the system is a closed one operating partly through gravity and partly through means of the pump.

Although this invention has been described in connection with certain specific embodiments, the principles involved are susceptible of numerous other applications which will readily occur to persons skilled in the art, and the invention is therefore to be limited only as indicated by the scope of the appended claims.

What I claim is:—

1. In a transmission lubricating system for tractors, a change speed compartment, a drive gear compartment, a wall separating the compartments, said wall having an opening above the bottom of the change speed gear compartment through which oil overflows, and means for supplying oil to the change speed compartment.

2. In a transmission lubricating system for tractors, a change speed compartment, a drive gear compartment, a wall separating the compartments, said wall having an opening above the bottom of the change speed compartment through which oil overflows, final drive compartments adjacent each side of the drive gear compartments each separated therefrom by a wall, said separating walls having an overflow opening therein above the bottom of the drive gear compartment through which oil overflows to the final drive compartments, and means for returning oil from the final drive compartments to the change speed gear compartment.

3. In a transmission lubricating system for tractors, a final drive gear compartment, final drive compartments on each side of the drive gear compartment, a wall separating each side compartment from the drive gear compartment, said walls having an opening therein above the bottom of the drive gear compartment through which oil drains, and means returning oil from the side compartments to the drive gear compartment.

4. In a tractor, a transmission casing, walls dividing the casing into a drive gear compartment and two side final drive gear compartments, said walls having an overflow opening therein, means for returning oil from the side compartments to the drive gear compartment, and means for deflecting oil in the side compartments from the openings when the tractor is tilted to cause the normal level to be above one of the openings.

5. In a tractor, a transmission casing, walls dividing the casing into a central compartment and side compartments, said walls having an opening therein through which oil in excess of a predetermined quantity will drain from the central compartments to the side compartments, means for returning oil draining into the side compartments to the central compartment, and shield members secured to the walls in the side compartments, said shield members extending over and below the openings in the walls.

6. In a transmission lubricating system for tractors, a casing divided into a central and side compartments each housing final drive gears, walls separating the side compartments from the central compartment, said walls having openings through which oil from the central compartment overflows to the side compartments, a distributor through which oil flows to the central compartment, conduit means leading from the side compartments to the distributor, and a pump for moving the oil through the conduit means.

7. In a transmission lubricating system for tractors, a casing divided into a central and side compartments each housing transmission gearing, walls separating the side compartments from the central compartment, said walls having openings through which oil from the central compartment overflows to the side compartments, a distributor through which oil flows to the central compartment, a pump in the central compartment connected with the distributor, and a pair of conduit members extending from the side compartments through the openings in the walls to the pump.

8. In a transmission lubricating system for tractors, a casing divided into a front compartment, a central compartment and side compartments each housing transmission gearing, a wall separating the front compartment from the central compartment, said wall having an opening through which oil overflows into the central compartment, walls separating the central compartment from the side compartments, said walls having an opening through which oil drains from the central to the side compartments, a distributor arranged to drain oil into the front and central compartments, a pump in the central compartment connected with the distributor, and a conduit extending from each side compartment to the pump through the openings in the separating walls.

9. In a tractor, a transmission casing divided by walls into a plurality of aligned compartments and side compartments, said walls having openings through which oil overflows rearwardly and then to the side compartments, a distributor casing removably secured on top of the transmission casing, said distributor forming a chamber with the transmission casing for leading oil into the aligned compartments, a pump connected with the distributor casing, and conduits leading from the side compartments to the pump.

10. In a tractor, a transmission casing divided by walls into a plurality of compartments in different levels, said walls having openings through which oil overflows by gravity, a casing for distributing oil to two of the compartments, said casing having a pair of inlet ducts, a pressure relief valve closing one of the inlet ducts, and means for moving oil from the lowermost compartments into the distributing casing through the inlet ducts.

In testimony whereof, I hereby affix my signature.

ROLLIN H. WHITE.